United States Patent
Becker

(10) Patent No.: US 9,614,461 B2
(45) Date of Patent: Apr. 4, 2017

(54) BIDIRECTIONAL HIGH FREQUENCY VARIABLE SPEED DRIVE FOR CHP (COMBINED HEATING AND POWER) AND FLYWHEEL APPLICATIONS

(71) Applicant: Princeton Power Systems, Inc., Lawrenceville, NJ (US)

(72) Inventor: Martin Gerhard Becker, Princeton Junction, NJ (US)

(73) Assignee: Princeton Power Systems, Inc., Lawrenceville, NJ (US)

( * ) Notice: Subject to any disclaimer, the term of this patent is extended or adjusted under 35 U.S.C. 154(b) by 0 days.

(21) Appl. No.: 14/557,847

(22) Filed: Dec. 2, 2014

(65) Prior Publication Data
US 2016/0156291 A1    Jun. 2, 2016

(51) Int. Cl.
| H02P 6/14 | (2016.01) |
| F01D 15/10 | (2006.01) |
| H02M 7/68 | (2006.01) |
| H02P 9/04 | (2006.01) |

(52) U.S. Cl.
CPC ............... *H02M 7/68* (2013.01); *H02P 9/04* (2013.01)

(58) Field of Classification Search
CPC .... H02P 6/14; H02P 9/04; B60L 11/16; B60L 7/16; B60L 11/08; H02M 7/68
USPC ........................................ 318/400.26; 290/52
See application file for complete search history.

(56) References Cited

U.S. PATENT DOCUMENTS

| 6,091,233 A | 7/2000 | Hwang et al. | |
| 7,042,110 B2* | 5/2006 | Mikhail | F03D 7/0224 290/40 C |
| 2002/0070557 A1* | 6/2002 | Geis | B60K 6/28 290/40 R |
| 2002/0080633 A1* | 6/2002 | Kang | F02C 7/08 363/71 |
| 2002/0149953 A1 | 10/2002 | Smedley et al. | |
| 2002/0175522 A1* | 11/2002 | Wacknov | H02P 9/04 290/52 |
| 2002/0195821 A1* | 12/2002 | Wacknov | F01D 15/10 290/12 |
| 2003/0007369 A1* | 1/2003 | Gilbreth | H02J 1/10 363/35 |

(Continued)

*Primary Examiner* — Bentsu Ro
*Assistant Examiner* — Zemenay Truneh
(74) *Attorney, Agent, or Firm* — Baker & Hostetler LLP

(57) ABSTRACT

The present invention provides a bidirectional high frequency speed drive configured to connect to a utility grid and an electrical machine. The bidirectional high frequency variable speed drive comprises a plurality of inductors each configured to connect to respective phase outputs of the electrical machine, a first plurality of power switches connected to the plurality of inductors, a second plurality of power switches connected to the plurality of inductors, and a controller connected to the first and second plurality of power switches. The controller can generate control signals based on an operating status and a predetermined operating status of the electrical machine. The first output of the first plurality of power switches can be interleaved to a second output of the second plurality of power switches. The present invention also provides methods for the bidirectional high frequency speed drive and apparatuses used to perform the methods of the present invention.

18 Claims, 15 Drawing Sheets

(56) References Cited

U.S. PATENT DOCUMENTS

| | | | |
|---|---|---|---|
| 2003/0015873 A1* | 1/2003 | Khalizadeh | H02P 9/04 |
| | | | 290/7 |
| 2005/0258795 A1* | 11/2005 | Choi | B29C 45/7666 |
| | | | 318/625 |
| 2007/0103941 A1 | 5/2007 | Liu et al. | |
| 2011/0215641 A1* | 9/2011 | Peterson | H01H 11/00 |
| | | | 307/23 |
| 2011/0299311 A1 | 12/2011 | Zhu et al. | |
| 2012/0008353 A1 | 1/2012 | Alexander | |

* cited by examiner

BIDIRECTIONAL HIGH FREQUENCY VARIABLE SPEED DRIVE FOR CHP (COMBINED HEATING AND POWER) AND FLYWHEEL APPLICATIONS

FIELD OF THE INVENTION

The disclosed invention is in the field of power electronics.

BACKGROUND OF THE INVENTION

Permanent magnet synchronous machines (PMSM) enable electrical generators to directly couple to turbines or flywheels without a gearbox. Direct interfacing without the gearbox requires converters interfacing with the turbines or flywheels to operate at comparatively high fundamental frequency. Present motor drives with converters such as Integrated Gate-Communicated Thyristor (IGCT) or Insulated Gate Bipolar Transistor (IGBT) do not allow for efficient interfacing with high speed and high voltage PMSM. Thus, there is a need for a power electronic device and method operating efficiently with high fundamental frequency of PMSM. The invention is directed to these and other important needs.

SUMMARY OF THE INVENTION

The present invention provides a bidirectional high frequency variable speed drive configured to connect to a utility grid and an electrical machine. For example, the bidirectional high frequency variable speed drive includes a plurality of inductors each configured to connect to respective phase outputs of the electrical machine, a first plurality of power switches connected to the plurality of inductors, a second plurality of power switches connected to the plurality of inductors, and a controller connected to the first and second plurality of power switches. The controller can generate control signals based on an operating status and a predetermined operating status of the electrical machine. First output of the first plurality of power switches are interleaved to second outputs of the second plurality of power switches.

The present invention provides methods performed by a bidirectional high frequency variable drive that comprises a first plurality of power switches, a second plurality of power switches and a controller. For example, the bidirectional high frequency variable drive converts a first power signal at a first frequency to a DC voltage. The bidirectional high frequency variable drive can receive, at the controller, a predetermined operating status and an operating status of an electrical machine. The electrical machine is configured to connect to the bidirectional high frequency variable drive. The bidirectional high frequency variable drive can generate a first control signal for the first plurality of power switches based on the operating status and the predetermined operating status. The first control signals are indicative of switching timing. The bidirectional high frequency variable drive can also generate a second control signal for the second plurality of power switches based on the operating status and the predetermined operating status. The second control signals are also indicative of switching timing. Upon generating the first and second control signals, the bidirectional high frequency variable drive can convert the DC voltage to a second power signal at a second frequency by the first and second plurality of power switches. The second frequency can be higher than the first frequency.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
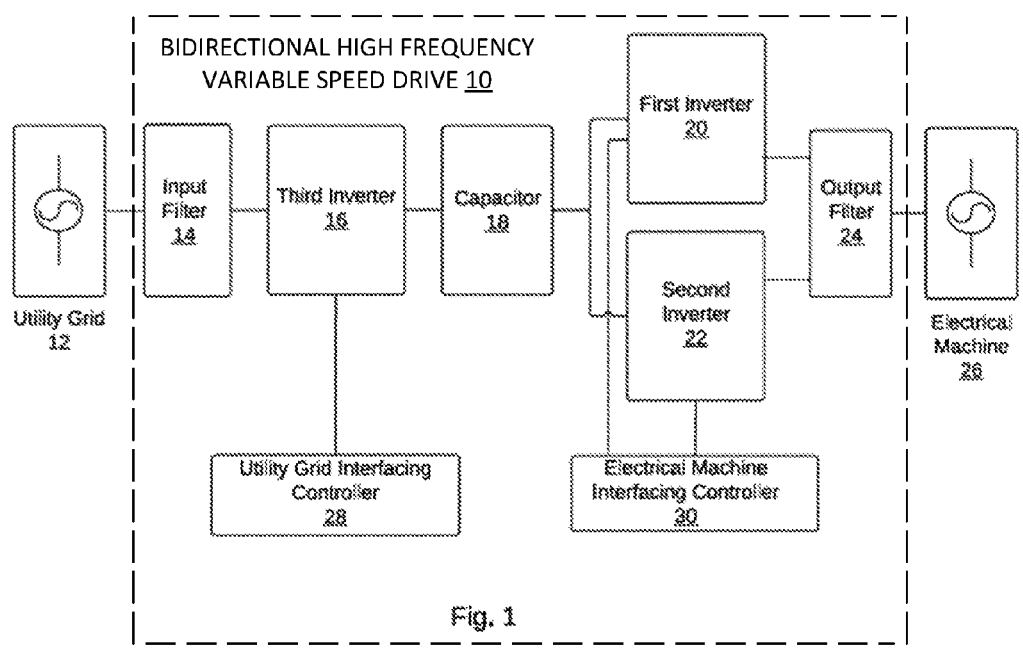
FIG. 1 is a block diagram of a bidirectional high frequency variable speed drive configured to connect to a utility grid and an electrical machine according to an example embodiment.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

Turbines offer effective conversion methods for converting pressure from compressed steam into electric power. High speed turbines can be built for very high power density and efficiency. However, the main drawback of a high speed turbine is the rotational speed of the shaft, which needs to be geared down to interface with conventional electric generators that interface with the utility. Recent advances in permanent magnet synchronous machines (PMSM), however, make it possible to couple electric generators to the turbine, eliminating the need for a gearbox.

Similarly, flywheel systems are short energy duration systems and offer energy storage with high power density, high cycle life and low environmental hazards when compared most electro-chemical battery technologies. Flywheels are usually based on permanent magnet synchronous generators to reduce maintenance and cope with their high speed requirement. For example, commercially available flywheels typically rotate at 16,000 rpm peak speed. Flywheels have a quadratic relationship to energy stored and speed ($E=\frac{1}{2} I W^2$ where I is inertia and W is the speed).

Direct interfacing without a gearbox usually requires converters interfacing with the turbines or flywheels to operate at comparatively high fundamental frequency. Present two-level, three-phase IGCT and IGBT based motor drives do not allow for efficient interfacing with high speed and high voltage gearless permanent magnet synchronous generators without interleaving the power stages. This restriction may arise from the switching frequency limitation of high power silicon based semiconductors such as IGBT and IGCTs that is typically limited to about 5-10 KHZ for efficiency reasons. For example, if a flywheel spins at 30,000 rpm and has a generator with two pole pairs connected on the rotating shaft, the resulting output frequency can be 1000 Hz. If the IGBT based generator interface switches at 9 KHZ that implies a modulation index of 9, nine switching operations per fundamental cycle is possible. Although this in itself may not be a problem, the nature of permanent synchronous machines is such that they have very low internal impedance, and thus requires the current supplied to have very low total harmonic distortion (THD). THD results in heating of the generator, which causes thermal issues in power dense applications such as turbine generators and flywheel generators.

As a result of the low internal impedance of PMSMs, a filter can be added to the motor/generator drive that introduces a voltage drop proportional to the fundamental frequency. Non-interleaved two-level pulse-width modulation drives do not provide the filter voltage drop with acceptable total harmonic distortion of the current supplied when switching the drive at 9 KHZ or less and the generator provides power at 1000 Hz. However, an interleaved drive that is compatible with increasing the turbine/flywheel and generator speed can offer low total harmonic current distortion while operating commercially available power switches such as IGBTs at frequencies where they can run efficiently. Even if power switches can operate at 10 s of KHZ like silicon carbide based power switches, the drive efficiency and weight can be improved by switching at lower frequencies and interleaving the output of multiple inverters.

In order to utilize these high speed generators for power generation or energy storage, the power generated needs to be compatible with the utility grid supply. Typically the frequency of the AC power generated by the gearless turbine-generator set is much higher than that of the utility. The bidirectional high frequency variable speed drive described herein can be connected between the generator and the utility to provide compatible frequency of AC power to the generator or the utility. The bidirectional high frequency variable speed drive can make use of relatively low switching frequency devices, which can be realized using interleaved three phase AC power stages with the interleaved predictive space vector controller in the synchronous plane. The space vector controller can use zero sequence compensation to eliminate circulating currents between power-stages using synchronous frame DQ0 transform.

In an embodiment, the bidirectional high frequency variable speed drive described herein can be used in gear-less high frequency generators that are typically coupled to steam turbines in CHP or flywheel energy storage systems. The CHP application is for replacing pressure reducing valves with power conversion systems for improved efficiency of CHP systems.

Specifically, the bidirectional high frequency variable speed drive can use power switches at relatively low switching frequency (<9000 Hz) or modulation index (9) compared to the up to 1000 Hz fundamental AC frequency from the generator. Maintaining very low total harmonic distortion (THD) and low impedance are desirable when the generators are permanent magnet synchronous machines used on the CHP turbine-generator set, for example.

The control system controlling the interleaved power electronic interface can control the inverter interfacing with the utility grid and the inverter interfacing with the generator. Both inverters can be bidirectional, which allows the inverter to start the turbine in applications where the steam pressure driven turbine input is replaced with combustible propulsion turbines or where the generator is connected to energy storage medium such as a flywheel. The control system can be based on a DQ0 controller with a predictive current control. Clark transformation can be used after the rotating frame Park transforms output the reference signals for current control.

Both grid and generator interface can use two-level voltage source inverters (VSIs) with controllers using Clark and Park transforms to create constant signals of current in the synchronous frame for simple computation. An outer loop proportional-integral (PI) controller can be used to control the speed of the generator and the DC bus voltage for the generator and grid inverter respectively. The main difference between the grid and generator inverter controller is that the grid controller can implement a negative sequence controller, while the generator controller can implement a positive and a zero sequence controller because no negative sequence is expected on a balanced generator supply. The generator controller can also implement predictive current control in the DQ vector (synchronous) space, thereby decoupling torque (current) commands from the speed regulator to avoid controller latencies and reducing bandwidth requirements on the controller.

FIG. 1 is a block diagram of a bidirectional high frequency variable speed drive 10 that is connected to a utility grid 12 and an electrical machine 26 according to an example embodiment. The bidirectional high frequency variable speed drive 10 can comprise an output filter 24 configured to connect to respective phase outputs of the electrical machine 12, a first inverter 20 connected to the output filter 24, a second inverter 22 connected to the output filter 24, and an electrical machine interfacing controller 30 connected to the first inverter 20 and the second inverter 22. A first output of the first inverter 20 can be interleaved to a second output of the second inverter 22. The electrical machine interfacing controller 30 can generate control signals based on an operating status and a predetermined operating status of the electrical machine 26.

In an embodiment, the electrical machine 26 is a generator which converts mechanical energy to electrical energy, or a motor which convert electrical energy to mechanical energy. The electrical machine 26 can be driven by at least one phase. Examples of the electrical machine 26 include a single-phase generator, a split-phase generator, a three-phase generator, a single-phase motor, a split-phase motor, a three-phase motor, or the like.

Each of the first inverter 20 and second inverter 22 can comprises a plurality of power switches for each phase of the electrical machine 26. The third inverter 16 can also comprise a plurality of power switches for each phase of the utility grid 12. Examples of the plurality of power switches can include Insulated-Gate Bipolar Transistor (IGBT), Integrated Gate-Commutated Thyristor (IGCT), or the like.

In an embodiment, outputs of the second inverter 22 can be interleaved with outputs of the first inverter 20. Interleaving the outputs of the first inverter 20 and second inverter 22 can provide the ability to supply currents to the electrical machine 26 with suitably low total harmonic distortion while running at a high fundamental frequency. Specifically, when interleaving the pulse-width modulated signals of the first 20 and second 22 inverters, the opposing current ripples can be canceled out to a large degree when the output signals of the first inverter 20 and the output signals of the second inverters 22 are summed at the output filter 24.

The input filter 14 can comprise a plurality of inductors and a plurality of capacitors arranged in an LCL low pass filter configuration. The capacitor can also be arranged in Y formation. The input filter 14 can reduce the current ripple from the pulse-width modulated signal from the third inverter 16 to a negligible value. The output filter 24 can also comprise a plurality of inductors. For example, a set of nine inductors makes the output filter 24 between the electrical machine 26 and the first 20 and second 22 inverters.

In an embodiment, the output filter 24 can comprise a three-phase output terminal for receiving three-phase AC power supply from the electrical machine 26 such as a generator or to provide three-phase AC supply to the electrical machine 26 such as a motor. The output filter 24 can reduce the ripple current from the pulse-width modulated signal provided by the first 20 and second inverters 22. The output filter 24 can also act as a summing device for the current generated by the first 20 and second 22 inverters.

The capacitor 18 can supply ripple current to the first 20, second 22, and third 16 inverters. The capacitor 18 can also absorb power ripple that is caused by voltage supply imbalance on the utility grid 12 and mitigate this from passing through to the electrical machine 26. The capacitor 18 can be sized to filter some of the power ripple caused by the utility imbalance.

The utility grid 12 can be configured to operate at a first frequency such as 60 HZ. The electrical machine 26 can be configured to operate at a second frequency such as 1000 HZ. The bidirectional high frequency variable speed drive 10 configured to connect to the utility grid 12 and the electrical machine 26 can be tailored to various power levels, voltages and currents and convert the first frequency to the second frequency or vice versa. For example, the bidirectional high frequency variable speed drive 10 can increase low frequency AC such as the 60 HZ supplied from the utility grid 12 to high frequency AC such as 1000 HZ AC supplied from the electrical machine 26. When the bidirectional high frequency variable speed drive 10 increases the first frequency of the utility grid 12 to the second frequency of the electrical machine 26, the plurality of power switches of the first 20 and second 22 inverters can be configured to operate at a switching frequency that is less than approximately 9 kilohertz (kHz). The bidirectional high frequency variable speed drive 10 can also reduce high frequency AC of the electrical machine 26 to low frequency AC of the utility grid 12.

Each of the plurality of power switches for the first 20, second 22 and third 22 inverters can be controlled by the control signals. The control signals can be generated by pulse-width modulation at a controller connected to the respective inverters. The control signals generated by pulse-width modulation are gating signals to determine turn-on and turn-off sequences of the plurality of power switches. Upon generating the control signals, the control signals are passed to the plurality of power switches. When the controller compute gating or pulse-width modulation signals to the plurality of power switches, the switching frequency of 9 KHZ can be used. This means that the plurality of power switches can be switched up to 9 KHZ without exhibiting excessive losses. The controller can comprise at least one of a processor, a microprocessor, a digital signal processor (DSP), or the like.

As described above, the bidirectional high frequency variable speed drive 10 can include at least one controller to generate the control signals for the inverters. For example, an electrical machine interfacing controller 30 generates control signals for the first inverter 20 and the second inverter 22. The electrical machine interfacing controller 30 can be configured to connect to the first inverter 20 and the second inverter 22 and measures voltages and currents of the electrical machine connection. Moreover, the electrical machine interfacing controller can control an operating speed of the electrical machine 26 based on the operating status and the predetermined operating status of the electrical machine 26. The operating status of the electrical machine 26 is indicative of a speed of the electrical machine 26. The operating status can be calculated based on the voltages measured on the electrical machine connection.

The predetermined operating status such as a speed command can be fed to the electrical machine interfacing controller 30.

In an embodiment, the electrical machine interfacing controller 30 can include a predictive current controller implemented in the DQ vector (synchronous) space. The predictive current controller can operate according to a speed of the electrical machine 26. Moreover, the predictive current controller can decouple torque (current) commands from the speed regulator to avoid controller latencies and reduce bandwidth requirements on the controller.

The bidirectional high frequency variable speed drive 10 can include a utility grid interfacing controller 28 configured to connect to the third inverter 16. The utility grid interfacing controller 28 can measure voltage and current of the utility grid connection to provide a steady DC supply to the inverters. Specifically, the utility grid interfacing controller 28 can control a DC bus voltage supplied to the third inverter 16 and/or supplied to the first 20 and second 22 inverters.

The utility grid interfacing controller 28 can be based on a Clark transformation (ABC to $\alpha\beta$) followed by a frequency transformation to extract positive and negative sequence vectors from the measured currents. Thus, the utility grid interfacing controller 28 can control the current unbalance or negative sequence current. The difference between the utility grid interfacing controller 28 and the electrical generator interfacing controller 30 is that the utility grid interfacing controller 28 can implement a negative sequence controller, while the electrical generator interfacing controller 30 can have a positive and a zero sequence controller.

Figure 2:
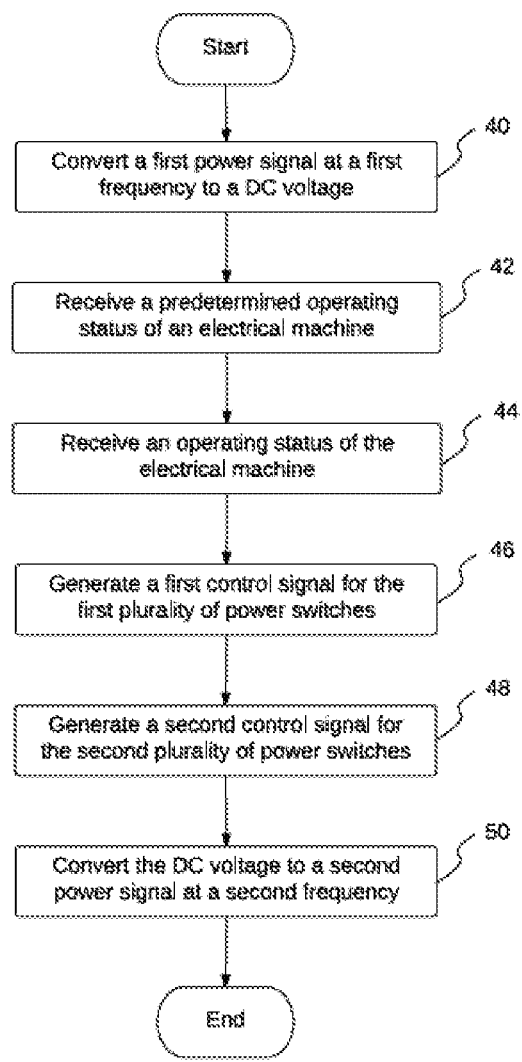
FIG. 2 is an example process flow that can be performed by the bidirectional high frequency variable speed drive illustrated in FIG. 1.

FIG. 2 is an example process flow that can be performed by the bidirectional high frequency variable speed drive 10. The bidirectional high frequency variable drive 10 can comprises a first plurality of power switches, a second plurality of power switches and a controller to convert a first power signal at a low frequency to a second power signal at a high frequency. For example, at step 40, the bidirectional high frequency variable drive 10 converts a first power signal at a first frequency to a DC voltage. The first frequency is compatible with the utility grid supply. In order to convert the first power signal to the DC voltage, a third plurality of power switches can be configured to connect to the first and second plurality of power switches.

At step 42, the bidirectional high frequency variable drive 10 can receive, at the controller, a predetermined operating status of an electrical machine 26. The predetermined operating status is indicative of a speed command, which can be fed to the controller. At step 44, the bidirectional high frequency variable drive 10 can receive, at the controller, an operating status of the electrical machine 26. The operating status is indicative of a speed of the electrical machine 26, which is calculated by the controller based on the voltage measurements on the electrical machine connection.

At step 46, the bidirectional high frequency variable drive 10 can generate a first control signal for the first plurality of power switches based on the operating status and the predetermined operating status. The first control signals are indicative of switching timing. At step 48, the bidirectional high frequency variable drive can generate a second control signal for the second plurality of power switches based on the operating status and the predetermined operating status. The second control signals are also indicative of switching timing. The control signals can be generated by pulse-width modulation at the controller and determine turn-on and turn-off sequences of the plurality of first and second power switches. Upon generating the first and second control signals, the bidirectional high frequency variable drive 10 can convert, by the first and second plurality of power switches, the DC voltage to a second power signal at a second frequency. The first and second control signals are interleaved in time, thereby providing currents to the electrical machine 26 with suitably low total harmonic distortion while running at a high fundamental frequency. The second frequency that is compatible with the electrical machine 26 is higher than the first frequency.

EXAMPLES

Figure 3:
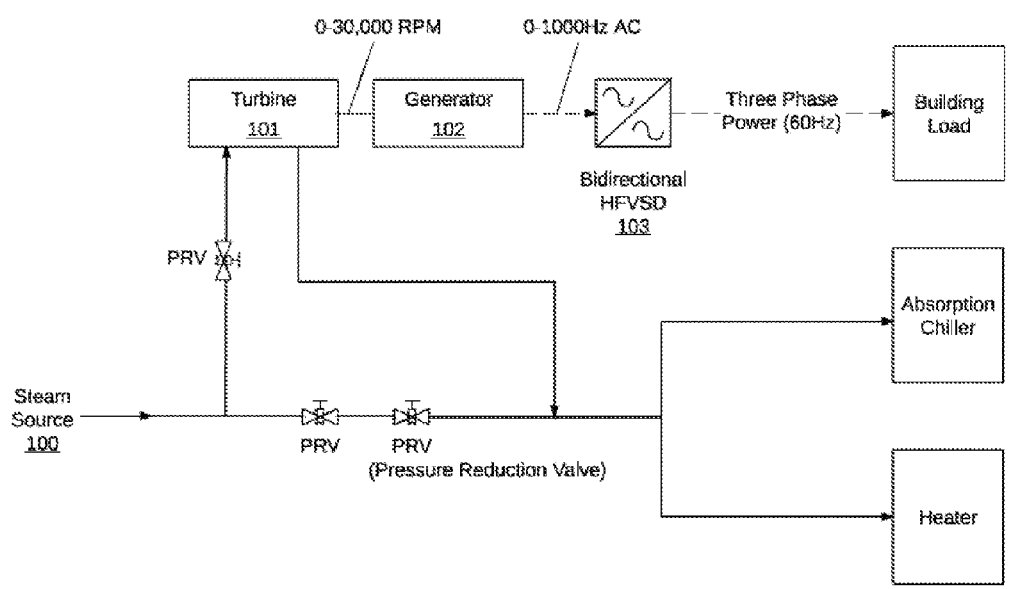
FIG. 3 is a block diagram of a bidirectional high frequency variable speed drive used in combination with a turbine and generator system according to an example embodiment.

FIG. 3 is a block diagram illustrating an application of the bidirectional high frequency variable speed drive (HFVSD) where it is used in combination with a turbine and generator system according to an example embodiment. As described in FIG. 3, the bidirectional HFVSD 103 can be applied to a central heating and power (CHP) application. For example, steam pressure from the steam source 100 can be utilized to for the heating and cooling of buildings as well as power generation. The generator 102 can generate electric power at frequencies up to 1000 Hz from steam pressure. The bidirectional HFVSD 103 can be based on a bidirectional AC-DC-AC pulse width modulated inverter topology as described in FIG. 5.

As described in FIG. 3, a central heating and power (CHP) system can be a heat engine or power plant which provides all the power for an individual building, for example, heating, ventilation, and air conditioning and electric power. It can be a version of cogeneration scheme which has been used with large scale electric power plants. The purpose is to utilize more of the energy in the fuel. The reason for using the CHP systems is that heat engines, such as steam power plants which generate the electric power needed for modern life by burning fuel, are not very efficient. Due to Carnot's theorem, a heat engine cannot be 100% efficient. This means that the heat engine does not convert all the heat in the fuel when it burns into useful forms such as electricity. Thus, heat engines produce a surplus of low-temperature waste heat which is called 'secondary heat' or low-grade heat'. Modern plants are limited to efficiencies of about 33-60% at most, so 40-67% of the energy can be exhausted as waste heat. In the past this energy was usually wasted to the environment. Cogeneration systems built in recent years in cold-climate countries utilize the waste heat produced by large power plants for heating, piping hot water from the plant into buildings in the surrounding community. However, it is not practical to transport heat long distances, due to heat loss from the pipes. Since electricity can be transported practically, it is more efficient to generate the electricity near where the waste heat can be used.

As shown in FIG. 3, the generator 102 powered by steam can be driven by turbine 101 that can operate at speeds as high as 30,000 rpm. If the generator 102 is directly connected to the shaft of the turbine 101, the frequency of the power generated is directly proportional to the number of pole pairs on the generator 102. For high powered generators, the lowest number of pole pairs is generally two which results in an output frequency of 1000 Hz.

Figure 4:
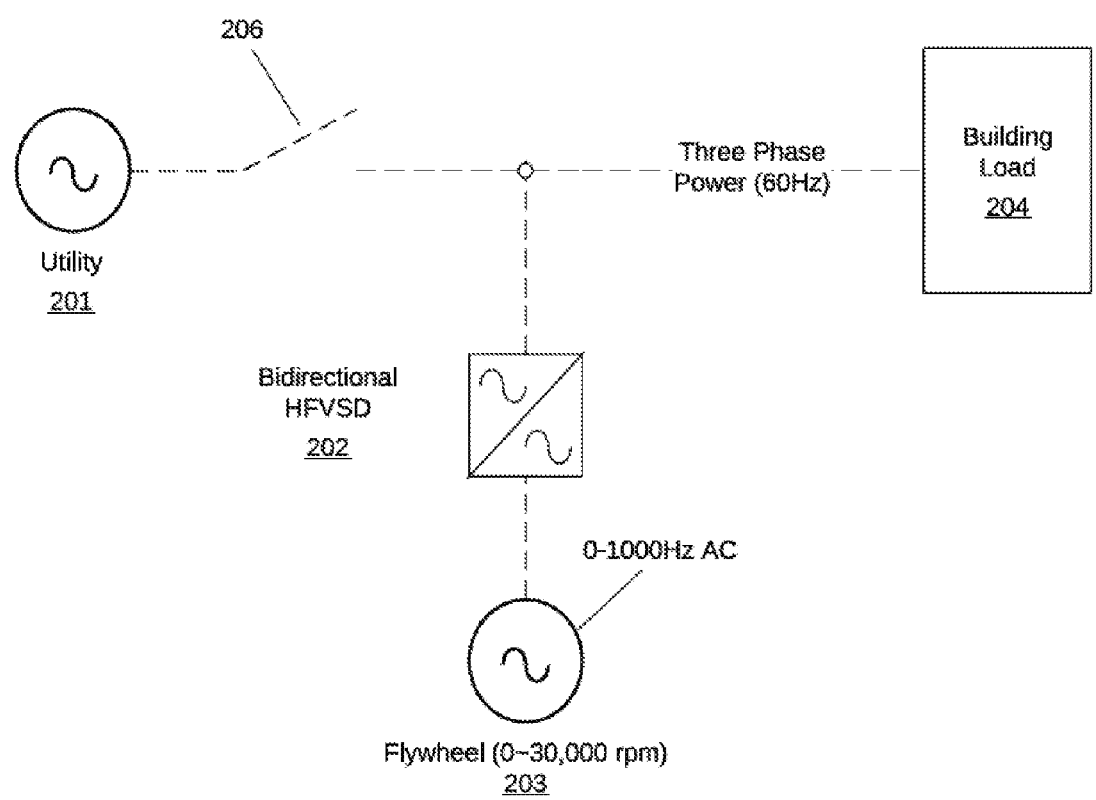
FIG. 4 is a block diagram of a bidirectional high frequency variable speed drive used in combination with a flywheel and generator system according to an example embodiment.

FIG. 4 is a block diagram illustrating an application of a bidirectional high frequency variable speed drive (HFVSD) where it is used in combination with a flywheel and generator system for energy storage according to an example embodiment. The energy storage can be used to supply electric power to the building load 204 during times of high demand and absorb electric power into the flywheel 203 for storage during times when the building load 204 is low. The flywheel 203 can also be used as backup power in case power supply from the utility 201 is lost and the building load 104 and energy storage has been isolated by the contactor 206.

In an embodiment, the flywheel 203 can be utilized for peak-load shaving and demand charge reduction. The flywheel 203 can supply power into the utility 201 to reduce the building load 204. The flywheel 203 can work by accelerating a rotor (flywheel) to a very high speed and maintaining the energy in the flywheel 203 as rotational energy. When energy is extracted from the flywheel 203, the flywheel's rotational speed is reduced as a consequence of the principle of conservation of energy; adding energy to the flywheel 204 correspondingly results in an increase in the speed of the flywheel 203. Flywheels with magnetic bearings and high vacuum can maintain 97% mechanical efficiency and 85% round trip efficiency. Current high performance flywheel assemblies spin at 16,000 rpm, which translates to an AC frequency of 530 Hz. The energy stored in the flywheel 203 can be 3.6 times higher if the rotational speed was increased to 30,000 rpm. Power electronics interfacing with such flywheel generators need to interface at 1000 Hz AC.

Figure 5:
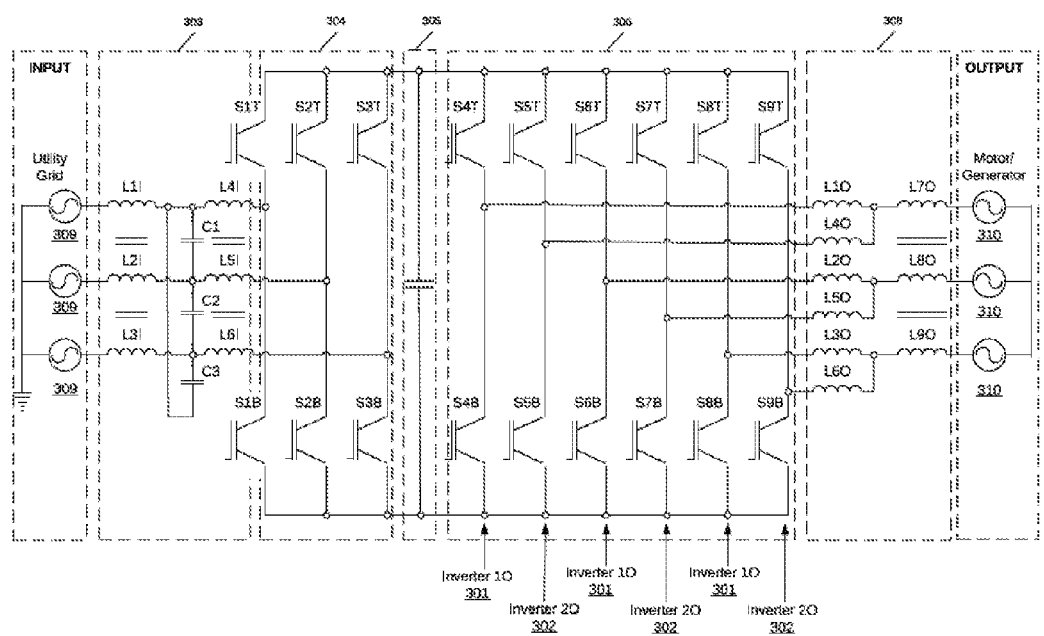
FIG. 5 is a circuit diagram of a bidirectional high frequency variable speed drive illustrated in FIG. 1 according to an example embodiment.

FIG. 5 is a circuit diagram of a bidirectional high frequency variable speed drive (HFVSD) according to an example embodiment. A set of power switches such as IGBTs can form an input inverter 304 for each phase of the three-phase utility grid 309. A set of power switches can also form an interleaved three-phase output inverter 306 (an inverter 1O 301 and an inverter 2O 302) for three-phase of motor/generator 310. The inverter 2O 302 can be interleaved with the outputs of the inverter 1O 301 which make up the output inverter 306. Interleaving the inverter 1O 301 and inverter 2O 302 can provide the ability to supply currents to the motor/generator 310 with suitably low total harmonic distortion while running at a high fundamental frequency.

An input filter 303 disposed between the input inverter 304 and the utility grid 309 can include inductors, capacitors, and inductor-LCL. An output filter 308 disposed between the output inverter 306 and the motor/generator 310 can include a set of nine inductors. The inductances connected directly to the motor/generator 310 can be mutually coupled, while these primary inductors connected to the power switches on the generator interface may not be coupled.

The bidirectional HFVSD as shown in FIG. 3 can be tailored to various power levels, operating voltages and currents. It can also serve as a universal power electronics concept for converting low frequency AC such as the 60 HZ supplied from the utility grid 309 to 1000 HZ AC such as supplied from motor/generator 310. Precise sizing of the switches such as IGBTs and filter components can depend on the requirement of THD required on either motor/generator 310 or utility grid 309.

In an embodiment, the bidirectional HFVSD can comprise a three phase input terminal for receiving a three phase AC power supply from the utility grid 309, a three phase low pass input filter 303, input inverter 303, a central DC bus capacitor 305, and output inverter 306, a three phase low pass output filter 308, and a three phase output terminal for supplying output voltage to a motor/generator 310.

The input filter 303 can reduce the current ripple from the pulse width modulated signal from the input inverter 304 to a negligible value. The input filter 303 can comprise inductors $L_{1I}$ to $L_{6I}$ and capacitors $C_1$ to $C_3$ that are arranged in an LCL low pass filter configuration where the capacitors are connected in a delta formation across the three phases. The capacitors $C_1$ to $C_3$ can also be arranged in Y formation. The cutoff frequency of the input filter 303 can be chosen at around 600-900 Hz, thereby reducing the current ripple, typically at switching frequency of 6-9 KHZ on IGBT based HFVSD.

A central DC bus capacitor 305 can supply ripple current to both input inverter 304 and output inverter 306. The capacitor 305 can also absorb power ripple that is caused by voltage supply imbalance on the utility grid 309 and mitigate this from passing through to the motor/generator 310. The input filter 303 and input inverter 304 can be set to import constant power on all three phases, even under some unbalanced utility conditions that can result in currents drawn from the utility grid 309 to be unbalanced. Supplying balanced currents to the utility grid 309 while the supply voltage is unbalanced can create a power imbalance that causes a current ripple on the DC bus capacitor 305. Thus, the DC bus capacitor 305 can be sized to filter some of the power ripple caused by the utility imbalance. This can prevent a high speed generator from undesired mechanical vibration due to the unbalanced power draw.

The output filter 308 can comprise a three-phase output terminal for receiving three-phase AC power supply from a generator or to provide three-phase AC supply to a motor. The output filter 308 can reduce the ripple current from the pulse width modulated signal provided by the output inverter 306. Moreover, the output filter 308 can act as a summing device for the current generated by the two interleaved inverters, the inverter 1O 301 and inverter 2O 302. Current flowing through $L_{1O}$ and $L_{4O}$ can be summed together before flowing through another filter inductor $L_{7O}$ to phase 1 of the motor/generator 310. Similarly, current through $L_{2O}$ and $L_{5O}$ and current from $L_{3O}$ and $L_{6O}$ can be summed before being supplied through $L_{8O}$ and $L_{9O}$ to phases 2 and 3 on the motor/generator 310 respectively.

Figure 12A:
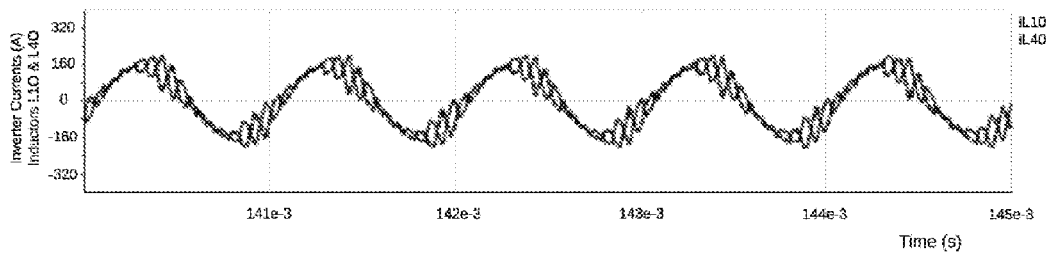
FIG. 12A-D are graphs illustrating current signals as measured by the motor/generator interface controller illustrated in FIG. 6 according to an example embodiment.
Figure 12B:
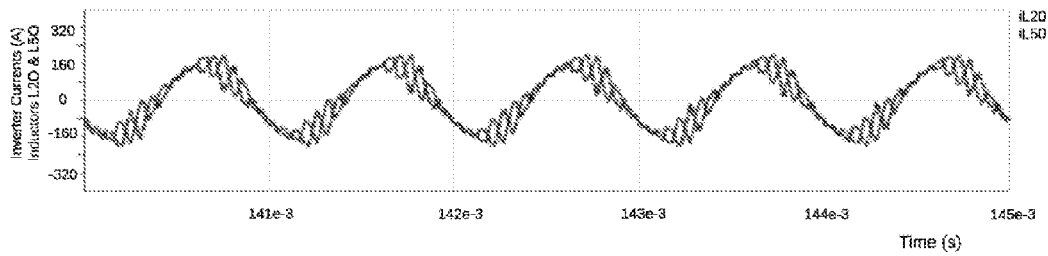
Figure 12C:
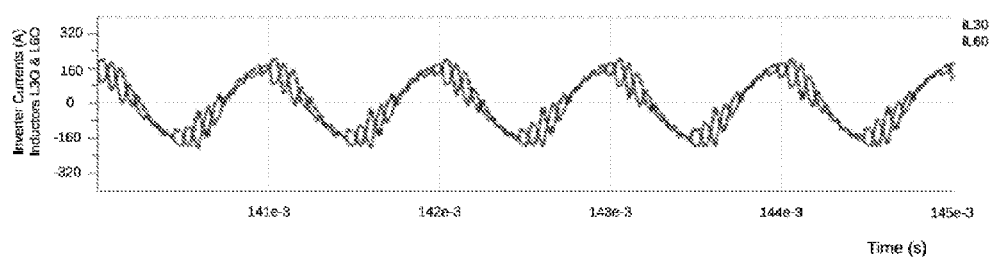

When interleaving the pulse with modulation of the two inverters, the inverter 1O 301 and inverter 2O 302 (by displacing the modulation frequency by 180° for example), the opposing current ripples through $L_{1O}$ and $L_{4O}$, when summed at the nodes such as at the output filter 308, can cancel out to a large degree before entering the final filter inductors $L_{7O}$. FIG. 12A illustrate the current ripple through inductors $L_{1O}$ and $L_{4O}$ when plotted together. When summed, this current signal can result in the current waveform shown in the fixed line in FIG. 12D. As a result of this current ripple cancelling effect, it may not be necessary to add an output filter capacitor such as shown on the input filter 303. Even a small output filter capacitor can add significant reactive current burden on the output inverter 306 at high frequencies such as 1000 Hz.

Figure 6:
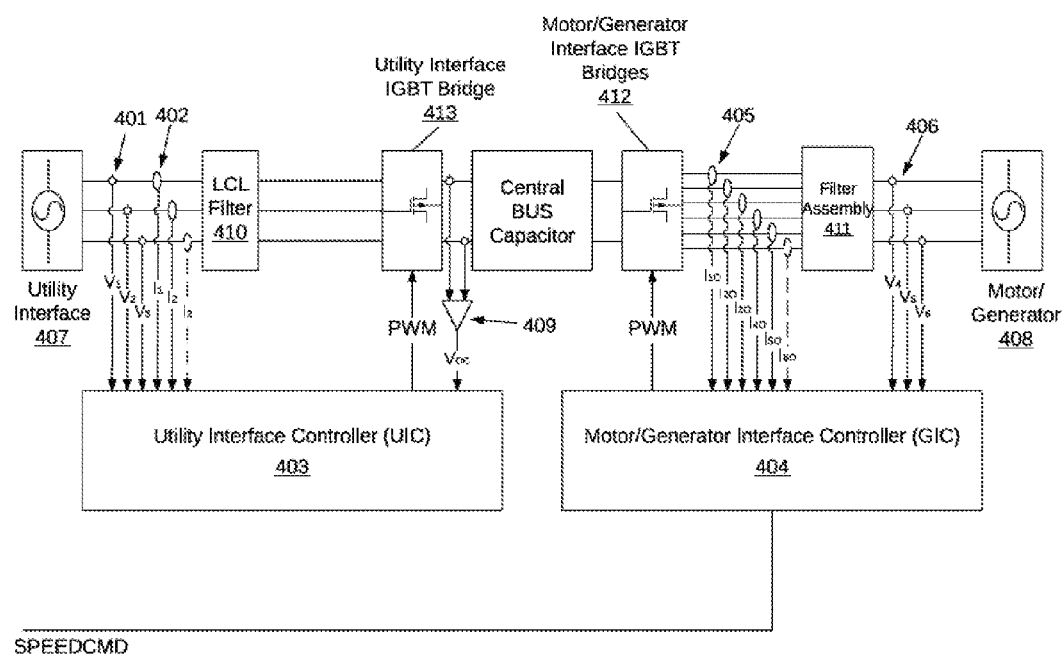
FIG. 6 is a block diagram of a bidirectional high frequency variable speed drive illustrating measurements used by a utility interface controller and a motor/generator interface controller according to an example embodiment.

FIG. 6 is a block diagram of a bidirectional high frequency variable speed drive illustrating measurements used by a utility interface controller and a motor/generator interface controller according to an example embodiment. The measurements can include both voltage and current measurements of the utility connection and voltage measurements of the motor/generator connection. At least five currents on the generator interface can be measured on each power switch set (half bridge) output. The primary user interface can be the control of speed of the motor/generator 408. This speed command can be fed to the motor/generator interface controller 404.

As shown in FIG. 6, voltage and current on the utility interface 407 can be measured as $V_1, V_2, V_3$ 401 and $I_1, I_2, I_3$ 402. These measurements then can be passed to the utility interface controller (UIC) 403. The UIC 403 can control the currents on the utility interface 407 to be synchronized and in phase with the measured utility voltages $V_1, V_2, V_3$ 401.

The magnitude of the current can be determined by the feedback from the DC bus voltage measurement 409. The purpose of the UIC is to provide a steady DC supply to the output inverter 306. When the motor/generator HFVSD is supplying power to the motor/generator 408, it may result in a draw on the DC bus that in return instructs the UIC 403 to set the current reference such that power is drawn from the utility. Likewise, when the generator is supplying power to the HFVSD, power from the output inverter 306 can be fed into the DC bus. To maintain steady DC voltage, the UIC 403 can adjust the input current measured at $I_1$, $I_2$, $I_3$ 402 to export the power generated.

The motor/generator interface IGBT bridges 412 can be controlled by the motor/generator interface controller (GIC) 404. As described above, two three-phase inverters can be interleaved on the motor/generator interface IGBT bridges 412. Their outputs can be summed in the filter assembly 411. However, since two three-phase inverters are used on the output, there can be six conductors where the current can be measured on, leaving the motor/generator interface IGBT bridges 412 and entering the filter assembly 411, for example, $I_{1O}$, $I_{2O}$, $I_{3O}$, $I_{4O}$, $I_{5O}$, and $I_{6O}$ 405. Currents can be measured directly on at least five of the six phase legs from the two inverters, to assure that currents flowing between the two three-phase inverters can be controlled. The sixth current measurement can extrapolate from the sum of the other five measurements. Currents flowing from first inverter to the second inverter (i.e. from $L_{1O}$ and back through $L_{4O}$ in FIG. 5) can be measured as zero-sequence or circulating currents when looking at one of the two three-phase inverters. Since the generator has three phases and no neutral connection, no zero sequence currents can leave the inverter and zero sequence current can be witnessed on measurements directly on the output of either of the two interleaved inverters.

Voltages V4, V5, V6 406 can be measured directly on the motor/generator terminals of the HFVSD. Voltage measurements can be used for speed measurements, synchronous current supply, and the feedback control circuit of the GIC 404.

In an embodiment, the specific drive parameters of the inverter can be sized so that it can supply 200 KW at 480 VAC to the utility interface from a generator that is supplying 300 A, 400V at 1000 Hz. A circuit can be realized using IGBT three-phase bridges from Semikron (SKiiP 613GD123). Two of these IGBT bridges can be used on the utility interface IGBT bridge 413 and two of these IGBT can be used on the motor/generator interface IGBT bridges 412. The utility interface IGBT bridge 413 on the utility facing side are simply paralleled while the IGBT bridges 412 on the generator facing interface are interleaved. The LCL filter 410 interfacing directly to the utility is based on a coupled composite 270 uH inductor assembly for $L_{1I}$, $L_{2I}$ and $L_{3I}$ and a coupled composite 540 uH inductor assembly for $L_{4I}$, $L_{5I}$ and $L_{6I}$ as shown in the input filter 303 in FIG. 5. The inductor assembly 411 on the output or motor/generator interface can form two sections. The first section is built up of six individual 140 uH inductors forming $L_{1O}$, $L_{2O}$, $L_{3O}$, $L_{4O}$, $L_{5O}$ and $L_{6O}$ and the second section with $L_{7O}$, $L_{8O}$, $L_{9O}$ can be a single composite inductor assembly with a value of 20 uH. The UIC 403 and GIC 404 can be integrated on a Texas Instruments Microcontroller (TMS320F28335). The UIC 403 and GIC 404 are capable of computing gating or PWM signals to the IGBT bridges so that a switching frequency of 9 KHZ can be used. The IGBT bridges can be switched up to 9 KHZ without exhibiting excessive losses. The overall efficiency of the motor drive was shown to be 97.6%. Isolated power supplies, gate drives and digital isolators may allow the Microcontroller to control the on-off states of the IGBTs. Differential voltage and current sensing circuits, with analog-digital interface included in the microcontroller can allow for precise switch timing to control current flow.

Figure 7:
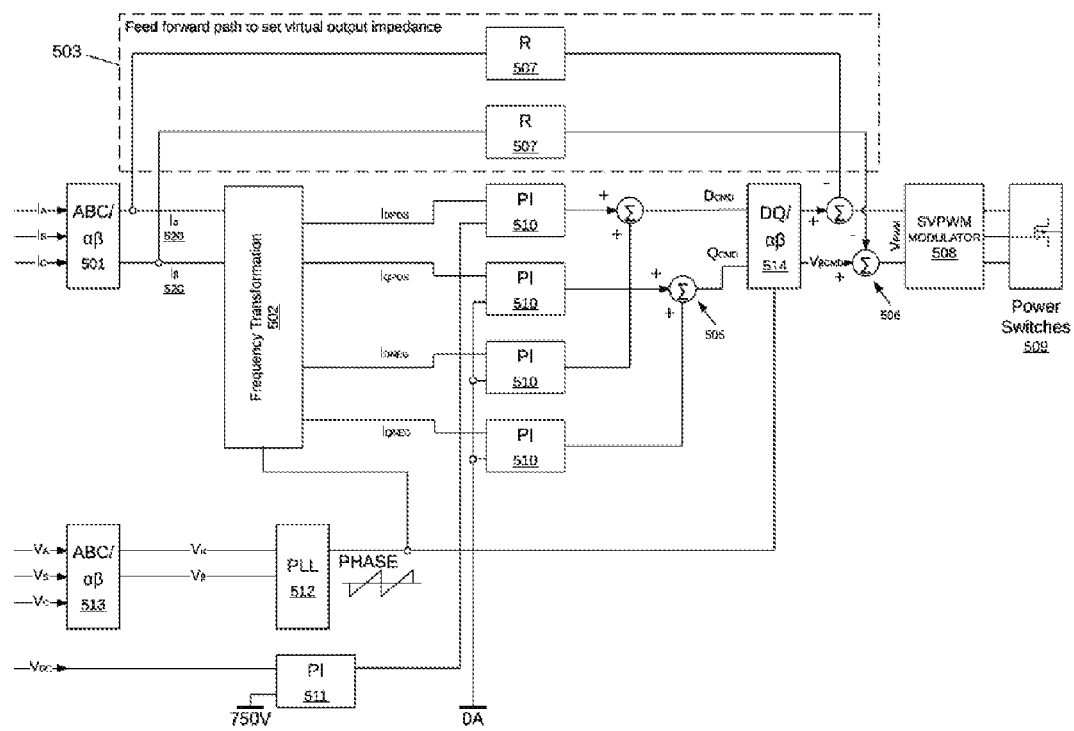
FIG. 7 is a block diagram of the utility interface controller illustrated in FIG. 6 according to an example embodiment.

FIG. 7 is a block diagram of the utility interface controller illustrating the control strategy of the inverter configured to connect to the utility according to an example embodiment. The utility interface controller 403 can be based on a Clark transformation (ABC to $\alpha\beta$) 501 followed by a frequency transformation 502 to extract positive and negative sequence rotating vectors from the three measured currents. The positive and negative sequence rotating vectors can be converted to constant signals to a synchronous frame with a Park (or $\alpha\beta$ to DQ) transformation. Proportional-Integral (PI) controllers 510 can regulate the positive and negative sequence currents. The resulting output reference can be supplied to a space vector pulse width modulation (SVPWM) modulator 508, which also generates the gating signals for the power switches 509. A feed forward path 503 can take the measured current vector and pass that to the output to add additional impedance in the otherwise low impedance control loop.

Interfacing with the utility may require the inverter to exhibit a couple of specifications that allow the reliable and stable operation with the utility. For example, the utility voltage in some basic applications may vary from a low 88% to 110% of the nominal 480V and still be within IEEE1547 specification for utility interface in the United States. Under unbalanced conditions, where voltages vary from line measurement to line measurement by percentages not exceeding the specifications, may cause inverters with classical space vector controllers to exhibit significant current unbalance and current tracking error. To regulate the utility currents to remain balanced, even when the voltage supply is not, a controller which controls the current unbalance or negative sequence current can be used. Such a controller has the advantage that even under unbalanced conditions the feedback signal can have little to no oscillations on the second harmonic. A frequency transformation 502 can be used to extract the $2^{nd}$ harmonic from the rotating vector components $I_\alpha$ and $I_\beta$ 520. This can provide the ability to separately compute, extract and control both positive and negative sequence vectors independently. Negative and positive sequence vector lengths do not contain any $2^{nd}$ harmonic.

To explain how the negative and positive vectors can be extracted in the frequency transformation 502, a three-phase (no neutral) current without any harmonics can be resented as a signal consisting of negative and positive sequence components:

$$I(t)=I_p(t)+I_n(t) \qquad \text{Equation 1}$$

This signal can also be represented as a vector in the complex plane as:

$$i=i_p+i_n \qquad \text{Equation 2}$$

where i is the measured current vector consisting of the two orthogonal vectors $I_\alpha$ and $I_\beta$ 520 (real and imaginary) and $i_p$ and $i_n$ are the positive and negative sequence vectors respectively. The current vector I(t) can be written as:

$$I(t)=I_p e^{i\omega t+\Theta}+I_n e^{-i\omega t+\Theta} \qquad \text{Equation 3}$$

where $I_p$ and $I_n$ are the positive and negative vector magnitudes and w is the fundamental radial frequency. Multiplying Equation 3 by $e^{-i\omega t}$ results in:

$$I(t)e^{-i\omega t}=I_p e^{\Theta}+I_n e^{-2i\omega t}e^{\Theta}=I_{DQ}(t) \qquad \text{Equation 4}$$

The negative sequence current vector $I_n$ may be calculated by extracting the fundamental of $I_{DQ}$ or the harmonic at twice the fundamental utility frequency $2*f_b$ with:

$$i_n = \sum_{t=0}^{N-1} e^{i2\pi t f_b/f_s} \cdot I_{DQ}(t) \qquad \text{Equation 5}$$

where $f_b$ is the fundamental frequency in Hz and $f_s$ is the switching frequency in Hz. The number of samples history that needs to be stored is given as:

$$N = f_s/8 f_b \qquad \text{Equation 6}$$

As long as the number of samples N that need to be stored is an integer, the minimum number of samples can contains $\frac{1}{8}^{th}$ of the fundamental cycle that is required to extract the $2^{nd}$ harmonic. If the number N is not an integer, multiples of N that result in integers can be chosen to compute Equation 5 accurately. Since Equation 5 is summing multiple measurements, the resulting control vectors are generally very stable. However, accuracy of the utility interface controller 403 can be further increased by taking values of N that are multiples of the minimum number of samples as shown in Equation 6.

Since the negative sequence vector was computed, the positive sequence vector can be calculated with:

$$i_p = i - i_n \qquad \text{Equation 7}$$

Since the vectors $i_p$ (positive sequence currents) and $i_n$ (negative sequence currents) are known, the negative sequence currents can be separately controlled from the positive sequence currents. This can be done with the four PI controllers 510. Ideally the utility interface can operate at unity power factor. Thus, the reference given to the controller which controls the reactive positive sequence currents can be set to 0 A. In an embodiment, the negative sequence currents is desired to be zero, therefore the controllers controlling the negative sequence currents can receive a zero current reference. In another embodiment, the negative sequence current references or the reactive current reference can be set to a non-zero value which enables the utility interface inverter to offer ancillary services like voltage balancing or automatic VAR injection/compensation.

To extract the rotating frame positive and negative sequence components of the current signal, the phase information is needed. This can be extracted from the utility voltages by using a phase lock loop 512. The phase lock can synchronize to the utility voltage vector from Clarke Transform (ABC/αβ) 513 by minimizing the reactive component of the product of the measured vectors and the internal references generated from the phase angle that is also channeled to the frequency transformation 502 such as the inverse Park Transform (DQ/αβ) 514.

The positive sequence real current can be used to set the level of power being imported and exported through the utility interface. For example, the reference for the positive sequence current target is supplied from a PI controller 511 that regulates the DC bus capacitor voltage 305 in FIG. 5 to 750V. The differential DC bus voltage measurement 409 shown in FIG. 4 can be fed into the PI controller 511 whose output directly sets the positive sequence real current target.

Before transforming the utility interface controller's 403 output command $D_{CMD}$ and $Q_{CMD}$ back to stationary frame αβ, the positive and negative sequence commands can be summed together again at 505. After the rotating frame vectors $D_{CMD}$ and $Q_{CMD}$ have been transformed to rotating frame, these vectors can be added to feed-forward signals from the current measurements at 506. This can be done to add damping into the output LCL filter. The LCL filter can exhibit undesired resonant peaks, which induces harmonics on the current fed to the utility. To avoid such resonance of the LCL filter, damping resistors can be added to the filter. However, these can make the high powered inverter inefficient and unpractical. To avoid these losses but still have the benefit of the resistance damping the LCL filter resonance, a virtual resistor R 507 can be added to the control circuit. This virtual resistance can be added by subtracting the voltage drop of the virtual resistor R 507 from the control output generated.

$$V_{PWM} = V_{\alpha\beta CMD} - RI_{\alpha\beta} \qquad \text{Equation 8}$$

The reference voltage $V_{PWM}$ for PWM generation can be supplied to the SVPWM modulator 508. The orthogonal signals $V_{PWM}$ can be transformed back to three-phase ABC coordinates, space vector modulation index calculated and then modulated with a carrier at the switching frequency. The resulting output logic signals are then sent to the IGBT bridges as gating signals to determine utility interface IGBT bridge's 413 turn-on and -off sequences.

Figure 8:
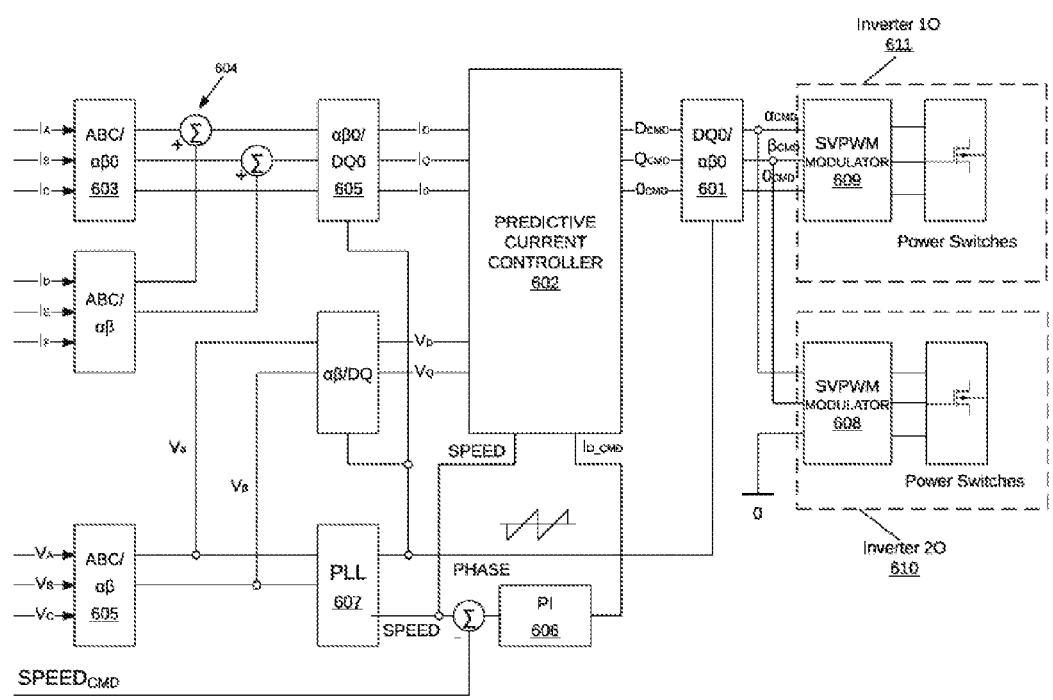
FIG. 8 is a block diagram of the motor/generator interface controller illustrated in FIG. 6 according to an example embodiment.

FIG. 8 is a block diagram of the motor/generator interface controller illustrating the control strategy of the inverter that is connected to the motor/generator according to an example embodiment. Current signals entering the motor/generator interface controller 404 can be fed to a Clark transformation (ABC to αβ) 603. After being summed, the current signals can be converted to constant signals to a rotating frame with a Park (or αβ to DQ) transformation 605. These constant signals can be used by the predictive current controller 602 to estimate the impedance connected between the generator and the power switches. Knowing the impedance allows the predictive current controller 602 to select exact command signals to the space vector pulse width modulator (SVPWM) 609 that generates the gating signals for the power switches.

To interface with the AC from the motor/generator, a synchronous frame transformation (DQ0 to αβ0) 601 can be performed to create a three-phase predictive current controller 602 where vectors can be computed at DC level. The predictive current controller 602 can make use of the cyclic property of AC by converting the commanded steady real and imaginary vector lengths to sinusoidal signals through a rotation to stationary frame (DQ0 to αβ0) or inverse Park transformation. This means that the AC frequency generated is independent of the control vectors generated to achieve a certain target current. This can give the controller the ability to make computation at a speed that is independent of the fundamental output frequency or the switching frequency.

If the filter impedances between the inverter power switches and the generator terminals is known precisely, the predictive current controller 602 is able to set the actual current output precisely when it was commanded. However, because parasitic impedances can exist in all the components, for example, in filters or power switches that typically vary with temperature, precise knowledge of all the parasitic impedances at all times may not be obtained. For this reason, the controller can have a circuit that allows the predictive current controller 602 to adapt to changes in the filter impedances. Similarly to the predictive current control described above, the adaptive control can be done in the rotating vector domain, which allows it to adapt the impedances independent of the output frequency of the motor/generator interfacing inverter.

In an embodiment, the stationary vector transformation (DQ0 to αβ0) 601 can take a set of command voltage vector lengths (both real and imaginary and zero sequence) and convert these vector lengths to orthogonal rotating vectors at the fundamental frequency generated on the output. A zero sequence reference command can also be generated. This zero sequence command can be forwarded to one of the two interleaved three-phase inverter space vector pulse width modulators (SVPWM) 609. The SVPWM can calculate the gating signals that are passed to the power switches for both interleaved three phase inverters such as the inverter 1O 301 and the inverter 2O 302. Since the motor/generator has no ability to draw or supply zero-sequence currents, the zero sequence currents can be circulated between the two three-phase inverter stages through the connections made at the output filter 308. This also means that if one of the two interleaved inverter stages (i.e. Inverter 1O 301) has no zero sequence components, there can be no zero sequence current flowing to the second inverter (i.e. Inverter 2O 302), because the zero sequence currents have nowhere to flow to. This implies that Inverter 1O 609 needs to control the zero sequence currents, $0_{CMD}$. The control for zero sequence currents can be set to zero on the inverter 2O 610. The rotating orthogonal command signals $\alpha_{CMD}$ and $\beta_{CMD}$ can be passed to both SVPWM modulators simultaneously. However, when generating the pulse width modulated gating signal for inverter 1O 611 and inverter 2O 610, the modulation signal (at 9 KHZ for example) used in Inverter 2O 610 can be 180° displaced from the modulation signal used in the SVPWM modulator for Inverter 1O 611. This gives the interleaving effect that can result in some current ripple cancellation when summed at the output filter 308.

The control voltages on this interleaved voltage source inverter (VSI) can be summarized with the following set of equations. The commanded voltage to the SVPWM modulator 609 is given by:

$$D_{CMD} = V_D + \Delta V_D$$

$$Q_{CMD} = V_Q + \Delta V_Q \qquad \text{Equation 9}$$

Here, $V_D$ and $V_Q$ are the real and reactive synchronous frame components of the measured voltage signal from the motor/generator. $\Delta V_{D,Q}$ is the voltage vector that is added to the output voltage command to set the current. A current is generated since $\Delta V_{D,Q}$ is the voltage drop over the filter components between the motor/generator and the inverter IGBT output where the commanded voltage $D,Q,0_{CMD}$ is generated. Knowing that current generated is as a result of the voltage $\Delta V_{D,Q}$ across the filter components, $\Delta V_{D,Q}$ can be rewritten as:

$$\Delta V_D = I_{D\_CMD} X - I_{Q\_CMD} Y$$

$$\Delta V_Q = I_{Q\_CMD} X - I_{D\_CMD} Y \qquad \text{Equation 10}$$

where X is the equivalent real impedance or filter series resistance and Y is the equivalent imaginary impedance or filter inductance between each inverter switch output and the generator. $I_{D,Q\_CMD}$ is the current vector and $\Delta V_{D,Q}$ is the voltage that can result in such a commanded current through the filter. By measuring the voltage and current vectors, the impedance of the filter can be extracted by the following when solving for impedance vectors X and Y:

$$X = \frac{\Delta V_D + I_Q Y}{I_D} \qquad \text{Equation 11}$$

$$Y = \frac{\Delta V_Q + I_Q X}{I_D}$$

X and Y can be independently solved as shown below:

$$X = \frac{\Delta V_D I_D + \Delta V_Q I_Q}{I_D^2 + I_Q^2} \propto \Delta V_D I_D + \Delta V_Q I_Q \qquad \text{Equation 12}$$

$$Y = \frac{\Delta V_Q I_D - \Delta V_D I_Q}{I_D^2 + I_Q^2} \propto \Delta V_Q I_D - \Delta V_D I_Q$$

Since the impedance of the filter is adjusted slowly using PI controllers and only the difference in estimated and real impedance is of interest, the normalization factor $I_D^2 + I_Q^2$ can be ignored. Only the proportional vectors are of concern as can be approximated as in the following equations:

$$\Delta X \propto \Delta V_D \Delta I_D + \Delta V_Q \Delta I_Q$$

$$\Delta Y \propto \Delta V_Q \Delta I_D - \Delta V_D \Delta I_Q \qquad \text{Equation 13}$$

Figure 9:
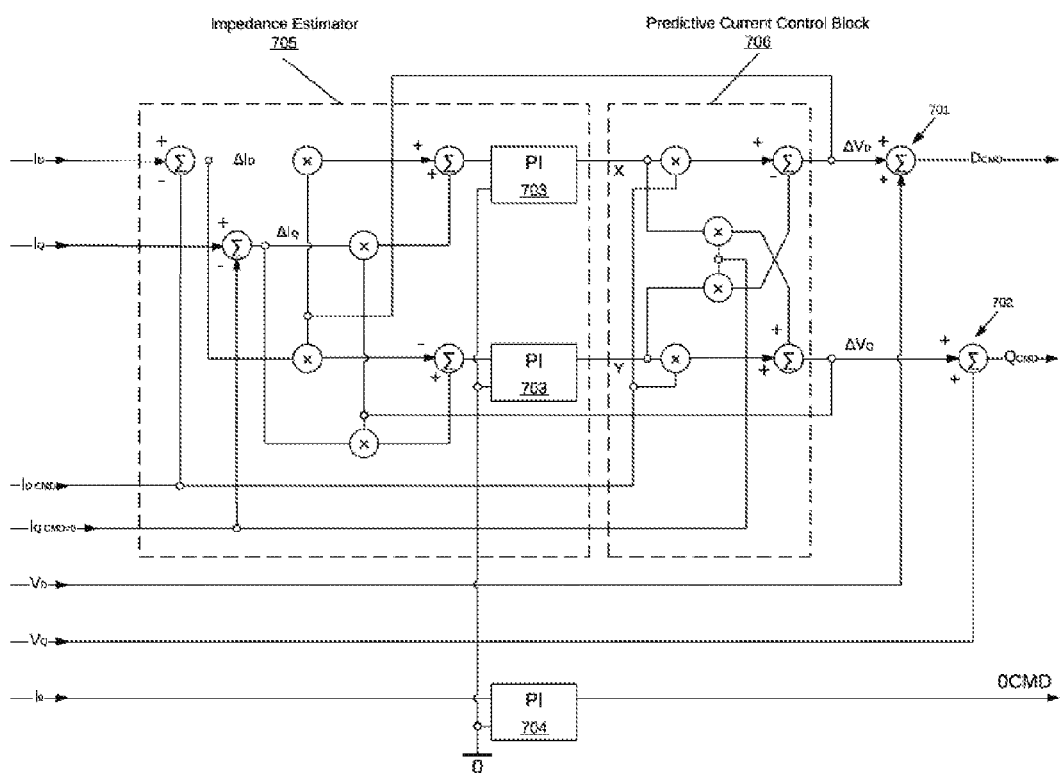
FIG. 9 is a block diagram of a predictive current controller illustrated in FIG. 8 according to an example embodiment.

FIG. 9 is a block diagram of a predictive current controller that uses constant current and voltage input vectors to calculate the impedance between the motor/generator and the power switches according to an example embodiment. The PI controllers 703 can be used to adapt the resistive and reactive impedance based on actual current feedback received versus target current. Controlling the impedances X and Y for the predictive current control block 706 can be done by estimating the impedances based on controlling the difference between the real and imaginary impedance ($\Delta X$ & $\Delta Y$) to zero. This can be done PI controllers 703. As $\Delta X$ & $\Delta Y$ approach zero, the output of these relatively slowly adjusted PI controllers 703 can be the impedance of the output filter 308 between the motor/generator terminals and the output inverter 306.

Figure 10A:
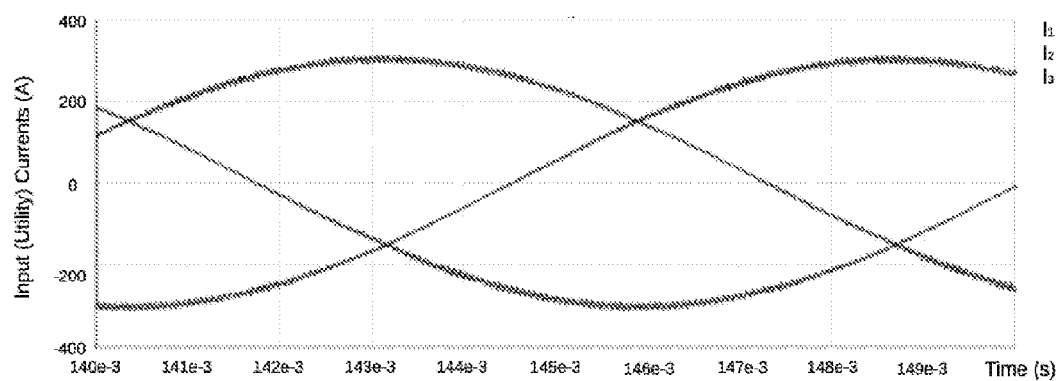
FIG. 10A-B are graphs illustrating voltage and current signals as measured by the utility interface controller illustrated in FIG. 6 according to an example embodiment.
Figure 10B:
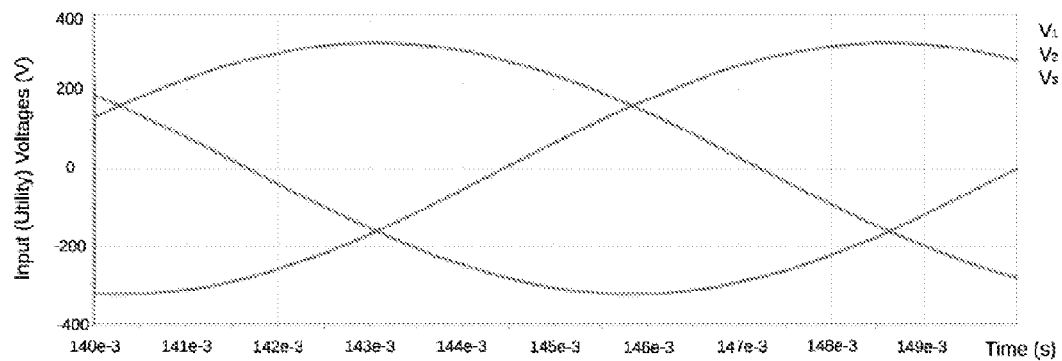

Zero sequence currents are an unfortunate side effect of interleaving two three phase inverters. By interleaving the two three phase inverters, circulating currents may exist between the two inverters sharing the same DC bus and load (motor/generator) connections. Fortunately, the zero sequence currents and the unbalance between the two inverters can be removed. After the zero sequence has been extracted from Inverter1O's 301 current measurements I1O, I2O, I3O 405 using the Clark 603 and Park 605 Transform, it can be controlled to zero using a simple PI controller 704. The output of this PI controller 704 can form the command for the zero sequence injection $0_{CMD}$ which is passed along to the inverse park transform and the SVPWM module. FIGS. 10A-B illustrates the currents through all six inductors $L_{1O}$, $L_{2O}$, $L_{3O}$, $L_{4O}$, $L_{5O}$ and $L_{6O}$ in the output filter 308. It can be seen that even at very high fundamental frequencies, no zero sequence currents exist between interleaved inverter phases. Inverter currents through $L_{1O}$ and $L_{4O}$ are summed and can offset from each other if zero sequence currents existed. Instead, the ripple current at switching frequency is displaced. However, the fundamental frequency component of both current $L_{1O}$ and $L_{4O}$ seems to have the same magnitude and phase and both are symmetrical around zero.

Figure 11A:
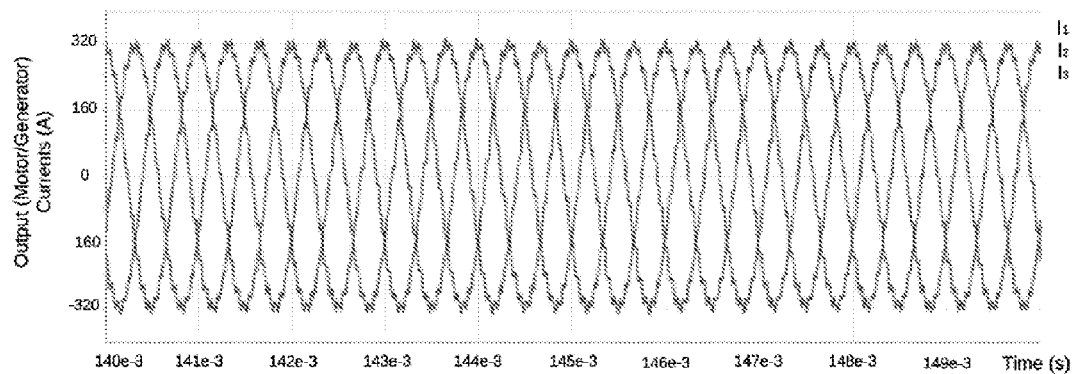
FIG. 11A-B are graphs illustrating voltage and current signals as measured at the output or connection to the motor/generator illustrated in FIG. 6 according to an example embodiment.
Figure 11B:
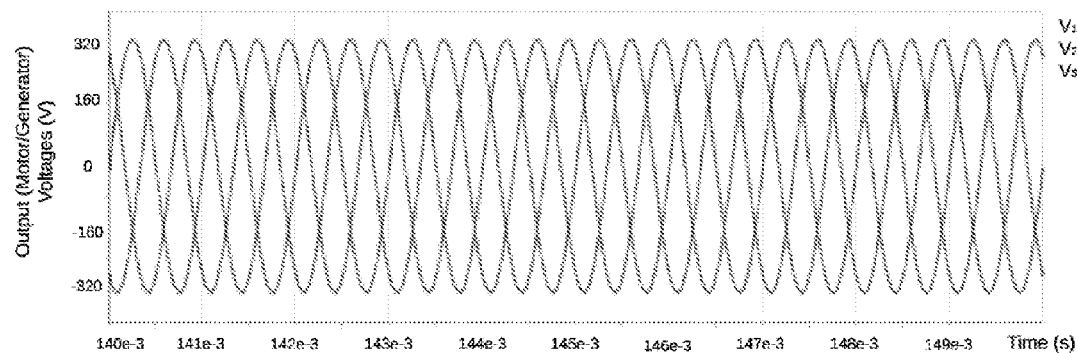

FIGS. 10A-B are graphs illustrating a typical voltage and current signal as measured by the utility interface controller over a period of 10 milliseconds according to an example embodiment. The frequency of the signal in FIGS. 10A-B is 60 Hz. FIGS. 11A-B are graphs illustrating a typical voltage and current signal as measured at the output or connection to the motor/generator over a period of 10 milliseconds. The frequency of the signal in FIG. 11A-B is 1000 Hz.

As shown in FIGS. 10A-B and FIGS. 11A-B, the current and voltage input and output of the HFVSD on the same time-scale can show the relative difference that the AC input signal can have from the output signal. The AC output frequency has been increased by over 16 times from the frequency that is supplied by the utility. The current quality can be further adjusted by adjusting the value of $L_{7O}$, $L_{8O}$ and $L_{9O}$ until the current supplied to the motor/generator meets the current THD specification. As described above, the value of the filter inductor is low (for example, 20 uH), and even slight increases in this filter can make for a significant reduction in current THD. Since the output current ripple can be largely cancelled by interleaving inverters and summing the output, the additional filter $L_{7O}$, $L_{8O}$ and $L_{9O}$ sees a much smaller ripple current than $L_{1O}$, $L_{2O}$, $L_{3O}$, $L_{4O}$, $L_{5O}$ and $L_{6O}$. The ripple frequency is typically at twice the switching frequency.

Figure 12D:
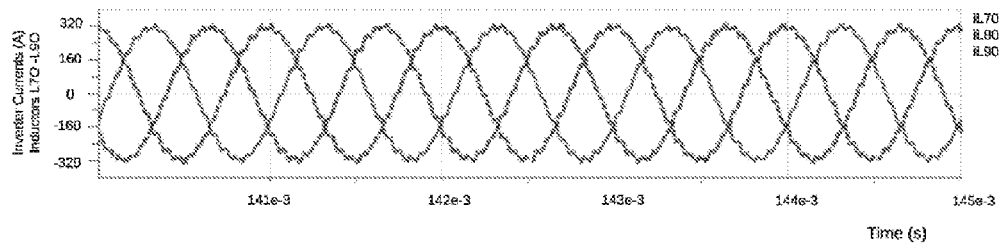

FIGS. 12A-D are graphs illustrating the currents as measured by the motor/generator interface controller according to an example embodiment. The motor/generator interface controller can measure the currents through all the output inductors at the output filter 308. FIG. 12D shows the currents on the generator over a period of 5 milliseconds. The currents shown in FIG. 12D are the sum of the currents from each of Figures A-C and are free of sub-harmonics, which is an undesired consequence of switching inverters at very low modulation indexes. Inverters are typically designed with a modulation index of 21 or higher to avoid sub-harmonics. The bidirectional HFVSD described herein can have a modulation index of 9 or 9 KHZ (switching frequency)/1000 HZ (fundamental frequency). Because the outputs of the inverter 1O 301 and inverter 2O 302 are interleaved, if sub harmonics were generated as a consequence of the low modulation index, they can be canceled out between the inverter stages. This means that the phase and amplitude of the sub-harmonic voltages can be precisely opposing in both inverter1O 301 and inverter 2O 302. Thus, none of the sub-harmonic content can leave the output terminals entering the motor/generator. Since sub-harmonics generate unwanted losses, they need to be minimized. Since the sub-harmonic currents circulate current between inverter power stages as described above, the sub-harmonic currents can be measured as zero-sequence currents. If the PI controller 704 controlling the zero sequence current were adjusted to be fast enough to cancel the zero sequence currents even at sub-harmonic frequencies, then there can be no efficiency losses because of sub-harmonic currents.

In an embodiment, the switching frequency of the motor/generator facing inverter can be synchronous with the fundamental frequency. This can remove the sub-harmonics and DC zero-sequence currents need to be compensated for. Synchronized switching means that the switching frequency is a multiple integer of the fundamental frequency. Since the output of the variable speed drive ranges in frequency as the motor/generator speeds up or slows down, the modulation index integer value needs to be adjusted. The filter can be designed for certain current ripple amplitude that otherwise increases beyond component ratings if the motor/generator were to run at 20 Hz and the modulation index were kept to be 9 as described above. In order to keep the filter inductors and power switches within the current ratings, the modulation index needs to be increased.

$$M_N = f_s/f_b \quad \text{Equation 14}$$

where $f_s$ is the switching frequency, $f_b$ is the fundamental output frequency and $M_N$ is the modulation index. Here, the key is to choose a modulation index that is an odd integer while the switching frequency $f_s$ is maintained within its nominal value, for example 7.3 to 9 KHZ, to keep the maximum current ripple and switching losses balanced. The modulation index needs to be changed to keep the switching frequency synchronized with the fundamental or base frequency while the modulation index is kept at odd integers and the switching frequency is kept within reasonable operating range. At 1000 HZ output frequency, the modulation index can be 9, which can result in 9 KHZ switching frequency. As the fundamental frequency drops on or slows down, the next odd integer modulation index can occur at 818 HZ. At this stage the modulation index increases to 11 to make the switching frequency 9 KHZ again. Before switching the modulation index, the switching frequency can be 7.36 KHZ, which results in 18% higher ripple until the modulation index changed. The next transition is at 692 HZ, where the modulation index changes from 11 to 13 and as the switching frequency jumps from 7.6 KHZ back to 9 KHZ. As the speed of the motor/generator reduces, the system may undergo many such transitions.

Figure 13A:
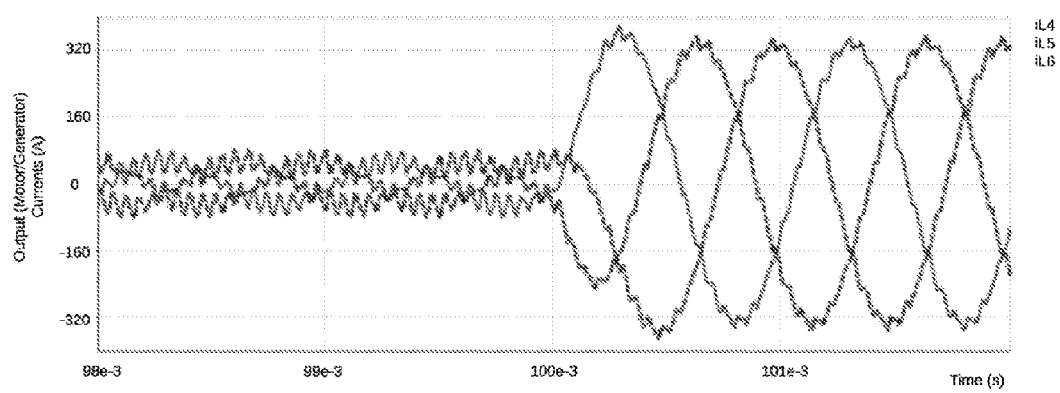
FIG. 13A-B are graphs illustrating current signals on the motor/generator when operating at 1000 Hz and subject to a step change from 50 A to 320 A real current command according to an example embodiment.
Figure 13B:
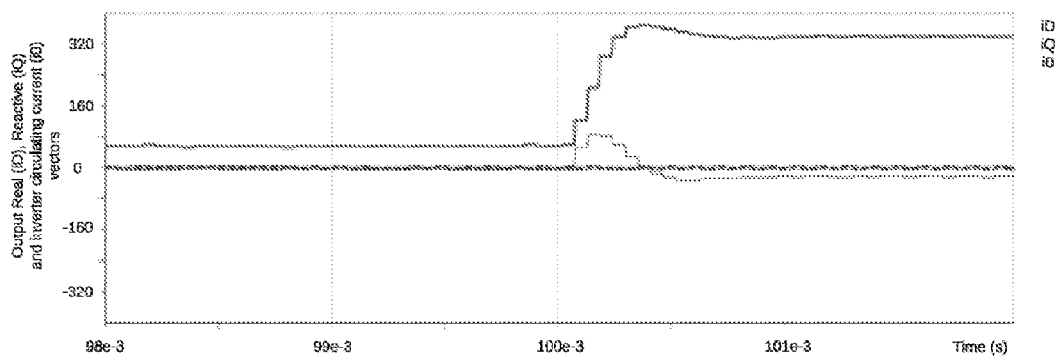

FIGS. 13A-B are graphs illustrating the currents on the motor/generator when operating at 1000 Hz and subject to a step change of real current command from 50 to 320 A according to an example embodiment. FIG. 13A illustrates the actual alternating currents. FIG. 13B illustrates the measured vector lengths after the αβ to DQ transformation shown in FIG. 8.

Figure 14A:
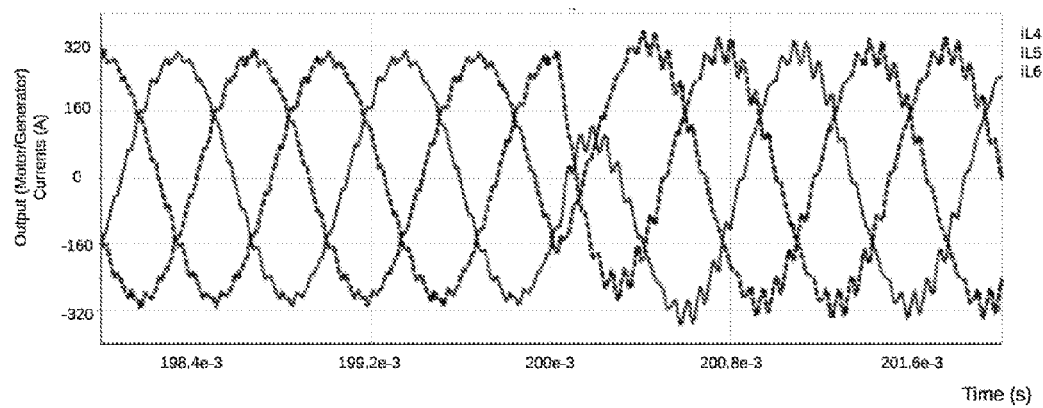
FIG. 14A-B are graphs illustrating current signals on the motor/generator when operating at 1000 Hz and subject to a step change from 300 A real current to 300 A reactive current according to an example embodiment.
Figure 14B:
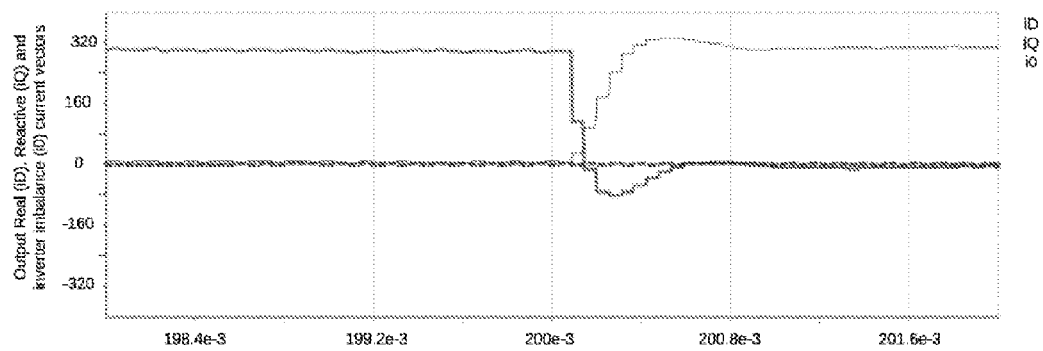

FIGS. 14A-B are graphs illustrating the currents on the motor/generator when operating at 1000 Hz and subject to a step change from 300 A real to 300 A reactive current according to an example embodiment. FIG. 14A shows the actual alternating currents. FIG. 14B shows the measured vector lengths after the αβ to DQ transformation shown in FIG. 8.

Load transitions shown in FIGS. 13A-B and FIGS. 14A-B can occur on predictive current basis as a result of the predictive current controller. As shown in FIGS. 13A-B, the load step transition from 50 A to 320 A can occur with a small step command in reactive current. This means that even at high fundamental frequency, the system is not burdened by the low bandwidth of the controller. Even though the controller processes the control at switching frequency, the response can be fast and accurate. The control system does not require precise tuning of the generator parameters, motor/generator speed, or power dependent control considerations. Since the feedback control is done and the measured filter impedances change slowly with temperature and age, the feedback bandwidth of the control circuit can be slow. It can be decoupled from the actual fundamental frequency. Thus, adjustments can be made on a second-to-second basis or even much slower than that.

FIG. 14A-B demonstrates how the system responds to a large step in reactive and real current. The real current command is instantly reduced from 300 A to zero, while the reactive current command is increased from zero to 300 A at the same time. The system can respond to such changes and settle well within 1 ms. In reality such fast response may not be required on typical generator applications. However, as shown in FIGS. 13A-B, the speed controller can control the real current command in a turbine system or flywheel system that can control the torque which is proportional to real current rapidly. This can aid the system in supplying demanded power instantly. For example, flywheel energy storage systems controlled by the regulator described above can provide stored energy from a flywheel within milliseconds accurately.

The bidirectional HFVSD described above can decouple the inner control loops of current or motor/generator torque from the outer speed control loop, so that control of speed of a motor/generator is dependent on the speed regulator, PI controller 606. This simplifies the tuning of a motor/generator for response and stability, since one control loop is determining the response to a commanded speed reference $SPEED_{CMD}$.

The predictive current controller can decouple the controller speed from the actual output frequency, such that the bandwidth of the controllers can be very low and disturbances can be rejected while employing fast response. Decoupling the controller speed from the fundamental output frequency can be performed by a predictive or feed-forward controller in the synchronous frame with adaptive control of the feed-forward gains to give accurate control with zero tracking error. In an embodiment, unbalances on the bidirectional utility interface can be compensated.

In an embodiment, multiple power stages can be interleaved and controlled by the controllers described above for lower distortion and higher power output. The bidirectional HFVSD is not limited to interleaving two three-phase inverters. On interleaving multiple inverters, the modulation frequency phase shift can be distributed evenly across the number of interleaved inverters. Circulating current between paralleled inverters sharing the same DC bus can be mitigated by controlling zero-sequence current on M−1 inverters, where M is the total number paralleled three-phase inverters.

In another embodiment, to further reduce the THD, a filter capacitor on the output node such as the output filter 308 can be added and included in the synchronous frame predictive current control block 706. Current targets can be set equally fast while providing the cleaner output current signal. The additional filter capacitor can make the predictive current control block 706 and impedance estimator 705 more complicated.

The predictive current control in the synchronous frame (DQ frame) described above is not limited to the use on motor/generators. It can be used on utility/microgrid interface where it is desired to decouple the inner current feedback controller from the outer DC bus voltage controller. The predictive current control in the synchronous frame can be adopted to supply unbalanced currents or voltage output so that it can be utilized where negative sequence needs to be controlled with the predictive controller. Supplying unbalanced currents can be useful for voltage balancing or other ancillary services provided to the utility or microgrid.

Controlling negative sequence is not limited to controlling the current. It can be used to control the output voltage as well. For example, the application with output voltage control may provide island power from a generator on microgrid systems. The power can be generated by energy storage such as a flywheel or energy source such as a steam/gas turbine. In microgrid systems, the loading on the three AC terminals (for example, input terminals in the utility grid 309) supplying the microgrid may not be balanced because of single phase loads connected on the microgrid three-phase supply. This may result in voltage unbalance on the network. However, if the negative sequence control as described in FIG. 7 is applied here to control the AC output voltage, rather than the current, the voltage unbalance can be removed.

The bidirectional HFVSD described above is not limited to three-phase application and can interface with single or spilt phase systems. A single or split-phase system may appear to the utility interface controller as a supply with heavy voltage unbalance. Since the utility interface controller can control currents into an unbalanced supply, such single and split-phase systems can be compatible with the utility interface controller.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed:

1. A bidirectional high frequency variable speed drive configured to connect to a utility grid and an electrical machine, comprising:
a plurality of inductors each configured to connect to respective phase outputs of the electrical machine, the electrical machine driven by at least one phase;
a first plurality of power switches connected to the plurality of inductors;
a second plurality of power switches connected to the plurality of inductors; and
an electrical machine interfacing controller connected to the first and second plurality of power switches, the electrical machine interfacing controller controlling an operating speed of the electrical machine, and comprising a positive and a zero sequence controller,
wherein a first output of the first plurality of power switches are interleaved to a second output of the second plurality of power switches, and the controller generates control signals based on an operating status and a predetermined operating status of the electrical machine.

2. The bidirectional high frequency variable speed drive of claim 1, wherein the electrical machine comprises at least one of a single-phase generator, a split-phase generator, a three-phase generator, a single-phase motor, a split-phase motor or a three-phase motor.

3. The bidirectional high frequency variable speed drive of claim 1, wherein the operating status of the electrical machine is indicative of the operating speed of the electrical machine.

4. The bidirectional high frequency variable speed drive of claim 1, wherein the utility grid is configured to be operable at a first frequency and the electrical machine is configured to be operable at a second frequency that is higher than the first frequency.

5. The bidirectional high frequency variable speed drive of claim 4, wherein each of the first and second plurality of power switches is configured to operate at a switching frequency to increase the first frequency to the second frequency that is compatible with the electrical machine.

6. The bidirectional high frequency variable speed drive of claim 5, wherein the switching frequency is less than approximately 9 kilohertz (kHz).

7. The bidirectional high frequency variable speed drive of claim 5, wherein each of the first and second plurality of power switches is controlled by each of the control signals.

8. The bidirectional high frequency variable speed drive of claim 7, wherein the each of the control signals is generated by pulse width modulation.

9. The bidirectional high frequency variable speed drive of claim 4, wherein each of the first and second plurality of power switches is configured to operate at a switching frequency to reduce the second frequency to the first frequency that is compatible with the utility grid.

10. The bidirectional high frequency variable speed drive of claim 1, wherein the electrical machine interfacing controller comprises a predictive current controller to avoid controller latencies.

11. The bidirectional high frequency variable speed drive of claim 10, wherein the predictive current controller operates according to the operating speed of the electrical machine.

12. The bidirectional high frequency variable speed drive of claim 1, further comprising a utility grid interfacing controller configured to control a DC bus voltage supplied to a third plurality of power switches configured to connect to the utility grid.

13. The bidirectional high frequency variable speed drive of claim 12, wherein the utility grid interfacing controller controls the DC bus voltage supplied to the first and second plurality of power switches.

14. The bidirectional high frequency variable speed drive of claim 13, wherein the utility grid interfacing controller comprises a negative sequence controller.

15. A bidirectional high frequency variable speed drive configured to connect to a utility grid and an electrical machine, comprising:
- a plurality of inductors each configured to connect to respective phase outputs of the electrical machine, the electrical machine driven by at least one phase;
- a first plurality of power switches connected to the plurality of inductors;
- a second plurality of power switches connected to the plurality of inductors;
- an electrical machine interfacing controller connected to the first and second plurality of power switches, wherein a first output of the first plurality of power switches are interleaved to a second output of the second plurality of power switches, and the electrical machine interfacing controller generates control signals based on an operating status and a predetermined operating status of the electrical machine; and
- a utility grid interfacing controller configured to control a DC bus voltage supplied to a third plurality of power switches configured to connect to the utility grid,
- wherein the utility grid interfacing controller controls a DC bus voltage supplied to the first and second plurality of power switches, and the utility grid interfacing controller comprises a negative sequence controller.

16. The bidirectional high frequency variable speed drive of claim 15, wherein the electrical machine interfacing controller comprises a predictive current controller to avoid controller latencies.

17. The bidirectional high frequency variable speed drive of claim 16, wherein the predictive current controller operates according to a speed of the electrical machine.

18. The bidirectional high frequency variable speed drive of claim 15, wherein the electrical machine interfacing controller comprises positive and a zero sequence controller.

* * * * *